US012649852B2

(12) United States Patent
Wang et al.

(10) Patent No.: US 12,649,852 B2
(45) Date of Patent: Jun. 9, 2026

(54) HYDROLYSIS-RESISTANT POLYCARBONATE COMPOSITION

(71) Applicant: Covestro Deutschland AG, Leverkusen (DE)

(72) Inventors: Leith Wang, Shanghai (CN); George Wang, Shanghai (CN)

(73) Assignee: Covestro Deutschland AG, Leverkusen (DE)

( * ) Notice: Subject to any disclaimer, the term of this patent is extended or adjusted under 35 U.S.C. 154(b) by 587 days.

(21) Appl. No.: 18/043,070

(22) PCT Filed: Aug. 26, 2021

(86) PCT No.: PCT/EP2021/073588
§ 371 (c)(1),
(2) Date: Feb. 27, 2023

(87) PCT Pub. No.: WO2022/043424
PCT Pub. Date: Mar. 3, 2022

(65) Prior Publication Data

US 2023/0312918 A1 Oct. 5, 2023

(30) Foreign Application Priority Data

Aug. 31, 2020 (WO) ................ PCT/CN2020/112449
Sep. 17, 2020 (EP) .................................... 20196570

(51) Int. Cl.
*C08L 69/00* (2006.01)

(52) U.S. Cl.
CPC .................................. *C08L 69/00* (2013.01)

(58) Field of Classification Search
CPC ...................................................... C08L 69/00
See application file for complete search history.

(56) References Cited

U.S. PATENT DOCUMENTS

| | | | |
|---|---|---|---|
| 2,393,967 A | 2/1946 | Brubaker | |
| 2,991,273 A | 7/1961 | Hechelhammer et al. | |
| 2,999,835 A | 9/1961 | Goldberg | |
| 2,999,846 A | 9/1961 | Schnell et al. | |
| 3,148,172 A | 9/1964 | Fox et al. | |
| 3,271,367 A | 9/1966 | Schnell et al. | |
| 3,419,634 A | 12/1968 | Vaughn, Jr. | |
| 3,671,487 A | 6/1972 | Abolins | |
| 3,723,373 A | 3/1973 | Lucas | |
| 3,838,092 A | 9/1974 | Vogt et al. | |
| 4,584,360 A | 4/1986 | Paul et al. | |
| 4,982,014 A | 1/1991 | Freitag et al. | |
| 5,097,002 A | 3/1992 | Sakashita et al. | |
| 5,340,905 A | 8/1994 | Kuhling et al. | |
| 5,717,057 A | 2/1998 | Sakashita et al. | |
| 6,518,357 B1 | 2/2003 | Rajagopalan et al. | |
| 6,596,840 B1 | 7/2003 | Kratschmer et al. | |
| 8,927,636 B2 | 1/2015 | Monden | |
| 2011/0207846 A1* | 8/2011 | Monden .................. | C08L 69/00 523/134 |

FOREIGN PATENT DOCUMENTS

| | | | |
|---|---|---|---|
| CN | 108314888 | A | 7/2018 |
| DE | 1570703 | | 2/1970 |
| DE | 2036052 | A1 | 1/1972 |
| DE | 2063050 | A1 | 7/1972 |
| DE | 2211956 | | 10/1973 |
| DE | 3334782 | A1 | 10/1984 |
| DE | 3832396 | A1 | 2/1990 |
| EP | 1279694 | A1 | 1/2003 |
| EP | 2336247 | A1 | 6/2011 |
| EP | 2787041 | A1 | 10/2014 |
| FR | 1561518 | | 2/1969 |
| GB | 1122003 | | 7/1968 |
| GB | 1229482 | | 4/1971 |
| GB | 1367790 | | 9/1974 |
| JP | 1217039 | A | 8/1989 |
| JP | 5125187 | A | 5/1993 |
| JP | 6263875 | A | 9/1994 |
| JP | 4890766 | B2 | 3/2012 |
| WO | 0105866 | A1 | 1/2001 |
| WO | 0105867 | A1 | 1/2001 |
| WO | 2004063249 | A1 | 7/2004 |
| WO | 2014037375 | A1 | 3/2014 |

OTHER PUBLICATIONS

English machine translation of CN 108314888A. (Year: 2018).*
Freitag et al., Bayer AG, Polycarbonates, Encyclopedia of Polymer Science and Engineering, 1998, p. 648-718, vol. 11, Second Edition.
Grigo et al., Polycarbonate, Engineering Thermoplastics, Polycarbonate, Polyacetale, Polyester, Celluloseester, Kunststoff-Handbuch,Mar. 1, 1992, p. 117-299, Becker/Braun.
Schnell, Chemistry and Physics of Polycarbonates, 1964, vol. 9, Interscience Publishers, Germany.
McCane, Tetrafluoroethylene Polymers, Encyclopedia of Polymer Science and Technology, 1970, pp. 623-654, vol. 13, John Wiley & Sons, Inc., New York.
Modern Plastics Encyclopedia, 1970-1971, Oct. 1970, pp. 134 and 774, vol. 47, No. 10 A, McGraw-Hill, Inc., New York.
Modern Plastics Encyclopedia, 1975-1976, Oct. 1975, pp. 27, 28, and 472, vol. 52, No. 10 A, McGraw-Hill, Inc., New York.

(Continued)

*Primary Examiner* — John E Uselding
(74) *Attorney, Agent, or Firm* — Richard P. Bender

(57) ABSTRACT

The present invention relates to a polycarbonate composition including the following components: A) 80-97.5 parts by weight of aromatic polycarbonate; B) 0.1-0.3 part by weight of metal organic sulfonate; C) 0.3-0.7 parts by weight of anti-dripping agent; D) 0.1-4 parts by weight of hydrolysis stabilizer; and E) 2-7 parts by weight of polysilsesquioxane. The total amount of the composition is 100 parts by weight. The present invention also relates to a shaped article made from the composition. The polycarbonate composition according to the present invention has a good combination of hydrolysis resistance and flame retardance.

12 Claims, No Drawings

(56) References Cited

OTHER PUBLICATIONS

Schildknecht, Vinyl and Related Polymers, 1952, pp. 484-494, John Wiley &Sons, Inc., New York.
Schmidhauser and Sybert, High-Tg Polycarbonate, Handbook of Polycarbonate Science and Technology, 2000, pp. 70-72, Marcel Dekker Inc., New York.

* cited by examiner

HYDROLYSIS-RESISTANT POLYCARBONATE COMPOSITION

CROSS-REFERENCE TO RELATED APPLICATIONS

This application is the United States national phase of International Application No. PCT/EP2021/073588 filed Aug. 26, 2021, and claims priority to International Application No. PCT/CN2020/112449 filed Aug. 31, 2020 and European Patent Application No. 20196570.4 filed Sep. 17, 2020, the disclosures of which are hereby incorporated by reference in their entireties.

BACKGROUND OF THE INVENTION

Field of the Invention

The present invention relates to a hydrolysis-resistant polycarbonate (PC) composition, and a shaped article made from the same.

Description of Related Art

Polycarbonate resin compositions are excellent in mechanical properties and electric characteristics such as dielectric strength, surface/volume resistance, dielectric constant, and are used generally for automobile applications as well as for electronic and electric device applications. Efforts have been made to develop polycarbonate compositions meeting the requirements for various applications.

U.S. Pat. No. 8,927,636B2 discloses a method for achieving good flame resistance, impact resistance and surface quality by incorporating a metal organic sulfonate, a fluoropolymer, specified silsesquioxane particles and a specified graft copolymer into a polycarbonate resin.

U.S. Pat. No. 6,518,357B discloses formulations which achieve UL94 V-0 at ⅛ inch and 1/16 inch thickness, obtained by blending polycarbonate with 3 different siloxane additives: poly(phenyl methyl siloxane), (phenyl silsesquioxane)-co-(dimethyl siloxane), and poly(phenyl vinyl silsesquioxane).

JP4890766 B2 discloses a light diffusing aromatic polycarbonate resin composition, in which special polyorganosilsesquioxane particles, weight loss thereof at 400-500° C. is 1 percent in (TGA) thermal gravimetric conforming to (B) JIS K7120, was used as light diffusing agent and added into polycarbonate. The light-diffusing aromatic polycarbonate resin composition exhibits high brightness when used in the direct type backlight light diffusion plate.

There are many requirements on the plastic housing materials for outdoor applications facing the harsh conditions such as extreme high or low temperature, high humidity, and fire risk etc. For electronic and electronic device (EE&A) outdoor applications, it requires plastic housing materials having good flame retardancy and excellent hydrolysis resistance. Excellent hydrolysis resistance certification requires the material to keep its flame-retardant performance unchanged after 7 days immersion in hot water of 70° C.

However, commercially available flame-retardant polycarbonate composition with UL94 V-0 performance cannot achieve V-0 performance after 7 days immersion in hot water of 70° C. and hence are not ideal for outdoor application.

Therefore, there is still a need for a polycarbonate composition with a V-0 performance according to UL94 having a good hydrolysis resistance, expressed in that an article with a thickness of 1.2 mm prepared therefrom can achieve V-0 performance also after 7 days immersion in hot water of 70° C.

SUMMARY OF THE INVENTION

One object of the present application is thus to provide a polycarbonate composition which has a good combination of hydrolysis resistance and flame retardancy, an article with a thickness of 1.2 mm prepared therefrom can achieve V-0 performance before and after 7 days immersion in hot water of 70° C.

According to the present invention, the hydrolysis resistance of a composition is good when the article with a thickness of 1.2 mm prepared therefrom achieves V-0 performance before and after 7 days immersion in hot water of 70° C.

This problem was surprisingly solved by a polycarbonate composition comprising the following components:

A) 80-97.5 parts by weight of aromatic polycarbonate;

B) 0.1-0.3 part by weight of metal organic sulfonate;

C) 0.3-0.7 parts by weight of anti-dripping agent;

D) 0.1-4 parts by weight of hydrolysis stabilizer; and

E) 2-7 parts by weight of polysilsesquioxane, wherein the total amount of the composition is 100 parts by weight.

A further object of the invention is a shaped article made from a polycarbonate composition according to the present invention.

Another object of the present invention is a process for preparing the shaped article mentioned before, comprising injection moulding, extrusion moulding, blow moulding or thermoforming the polycarbonate composition according to the present invention.

Another object of the present invention is use of polysilsesquioxane as hydrolysis resistance synergist in a polycarbonate composition comprising at least one hydrolysis stabilizer, wherein the amount of the polysilsesquioxane is 2-7 parts by weight, based on that the total amount of the polycarbonate composition is 100 parts by weight and wherein hydrolysis resistance synergist is understood to be a component which together with the hydrolysis stabilizer leads to hydrolysis resistance as defined above.

The polycarbonate composition according to the present invention has a good combination of hydrolysis resistance and flame retardancy.

The polycarbonate composition according to the present invention achieves a V-0 classification even with a low thickness, such as 1.2 mm, after 7 days immersion in water at 70° C., as measured in accordance with UL94:2015.

Other subjects and characteristics, aspects and advantages of the present invention will emerge even more clearly on reading the description and the examples that follow.

DESCRIPTION OF THE INVENTION

In that which follows and unless otherwise indicated, the limits of a range of values are included within this range, in particular in the expressions "between . . . and . . . " and "from . . . to . . . ".

Throughout the present application, the term "comprising" is to be interpreted as encompassing all specifically mentioned features as well as optional, additional, unspecified ones.

Unless defined otherwise, all technical and scientific terms used herein have the same meaning as commonly understood by one of ordinary skill in the art to which the present invention pertains. When the definition of a term in the present description conflicts with the meaning as commonly understood by those skilled in the art the present invention belongs to, the definition described herein shall apply.

Unless otherwise specified, all numerical values expressing amount of ingredients and the like which are used in the description and claims are to be understood as being modified by the term "about".

Component A

The polycarbonate compositions according to the present invention comprise aromatic polycarbonate as component A. The aromatic polycarbonate can be a mixture of one or more aromatic polycarbonates.

According to the invention, "aromatic polycarbonates" or else just "polycarbonates" is to be understood as encompassing both aromatic homopolycarbonates and copolycarbonates, including polyestercarbonates, wherein the polycarbonates may be linear or branched in familiar fashion. Also mixtures can be used.

A portion of up to 80 mol %, preferably of 20 mol % up to 50 mol %, of the carbonate groups in the polycarbonates used in accordance with the invention may be replaced by aromatic dicarboxylic ester groups. Polycarbonates of this kind, incorporating both acid radicals from the carbonic acid and acid radicals from aromatic dicarboxylic acids in the molecule chain, are referred to as aromatic polyestercarbonates. In the context of the present invention, they are encompassed by the umbrella term of the thermoplastic aromatic polycarbonates.

The replacement of the carbonate groups by aromatic dicarboxylic acid ester groups takes place essentially stoichiometrically and quantitatively, so that the molar ratio of the reaction partners can also be found in the finished polyestercarbonate. The incorporation of dicarboxylic acid ester groups can be statistical as well as in blocks.

The thermoplastic polycarbonates including the thermoplastic aromatic polyestercarbonates have weight average molecular weights $M_w$, determined by gel permeation chromatography under use of $CH_2Cl_2$ as diluent, of from 10,000 g/mol to 35,000 g/mol, preferably from 12,000 g/mol to 32,000 g/mol, more preferably from 15,000 g/mol to 32,000 g/mol, in particular from 20,000 g/mol to 31,500 g/mol, calibration with linear polycarbonate (made from bisphenol A and phosgene) of known molecular weight distribution, standards from PSS Polymer Standards Service GmbH, Germany, calibration according to method 2301-0257502-09D (from the year 2009 in German language) from Currenta GmbH & Co. OHG, Leverkusen. Diluent methylene chloride. Column combination from cross-linked styrene-divinylbenzene resin. Diameter of the analytical columns: 7.5 mm, length: 300 mm Particle size of the column material: 3 µm to 20 µm. Concentration of the solutions: 0.2 wt.-%. Flow rate: 1.0 ml/min, temperature of the solution: 30° C. Detection by means of a refractive index(RI)-detector.

Particulars pertaining to the preparation of polycarbonates are disclosed in many patent documents spanning approximately the last 40 years. Reference may be made here to Schnell, "Chemistry and Physics of Polycarbonates", Polymer Reviews, Volume 9, Interscience Publishers, New York, London, Sydney 1964, to D. Freitag, U. Grigo, P. R. Müller, H. Nouvertné, BAYER AG, "Polycarbonates" in Encyclopedia of Polymer Science and Engineering, Volume 11, Second Edition, 1988, pages 648-718 and finally to U. Grigo, K. Kirchner and P. R. Müller "Polycarbonate" [Polycarbonates] in Becker/Braun, Kunststoff-Handbuch [Plastics Handbook], volume 3/1, Polycarbonate, Polyacetale, Polyester, Celluloseester [Polycarbonates, Polyacetals, Polyesters, Cellulose Esters], Carl Hanser Verlag Munich, Vienna 1992, pages 117-299.

Preferred processes for the production of the polycarbonates which are used according to the invention, including polyestercarbonates, are the interfacial process and the melt transesterification process (e.g. WO 2004/063249 A1, WO 2001/05866 A1, WO 2000/105867, U.S. Pat. Nos. 5,340,905 A, 5,097,002 A, 5,717,057 A).

Aromatic polycarbonates are prepared, for example, by reaction of dihydroxyaryl compounds with carbonyl halides, preferably phosgene, and/or with aromatic dicarbonyl dihalides, preferably benzenedicarbonyl dihalides, by the interfacial process, optionally with use of chain terminators and optionally with use of trifunctional or more than trifunctional branching agents, wherein for the production of polyestercarbonates a part of the carbonic acid derivatives is replaced with aromatic dicarboxylic acids or derivatives of dicarboxylic acids, namely according to the carbonate structure units in the aromatic polycarbonates by dicarboxylic acid ester structure units. Preparation via a melt polymerization process by reaction of dihydroxyaryl compounds with, for example, diphenyl carbonate is likewise possible.

Dihydroxyaryl compounds suitable for the preparation of polycarbonates are those of the formula (1)

$$HO—Z—OH \quad (1),$$

in which

Z is an aromatic radical which has 6 to 30 carbon atoms and may contain one or more aromatic rings, may be substituted and may contain aliphatic or cycloaliphatic radicals or alkylaryls or heteroatoms as bridging elements.

Preferably, Z in formula (1) is a radical of the formula (2)

(2)

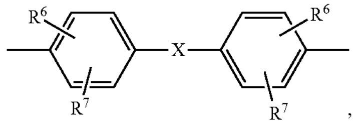

, in which $R^6$ and $R^7$ are each independently H, $C_1$- to $C_{18}$-alkyl-, $C_1$- to $C_{18}$-alkoxy, halogen such as $C_1$ or Br or in each case optionally substituted aryl or aralkyl, preferably H or $C_1$- to $Cl_2$-alkyl, more preferably H or $C_1$- to $C_8$-alkyl and most preferably H or methyl, and X is a single bond, —$SO_2$—, —CO—, —O—, —S—, $C_1$- to $C_6$-alkylene, $C_2$- to $C_5$-alkylidene or $C_5$- to $C_6$-cycloalkylidene which may be substituted by $C_1$- to $C_6$-alkyl, preferably methyl or ethyl, or else $C_6$- to $Cl_2$-arylene which may optionally be fused to further aromatic rings containing heteroatoms.

Preferably, X is a single bond, $C_1$- to $C_5$-alkylene, $C_2$- to $C_5$-alkylidene, $C_5$- to $C_6$-cycloalkylidene, —O—, —SO—, —CO—, —S—, —$SO_2$— or a radical of the formula (2a)

(2a)

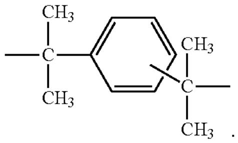

Examples of dihydroxyaryl compounds suitable for the preparation of the polycarbonates for use in accordance with the invention include hydroquinone, resorcinol, dihydroxydiphenyl, bis(hydroxyphenyl)alkanes, bis(hydroxyphenyl) cycloalkanes, bis(hydroxyphenyl) sulphides, bis(hydroxyphenyl) ethers, bis(hydroxyphenyl) ketones, bis (hydroxyphenyl) sulphones, bis(hydroxyphenyl) sulphoxides, α,α'-bis(hydroxyphenyl)diisopropylbenzenes and the alkylated, ring-alkylated and ring-halogenated compounds thereof.

Preferred dihydroxyaryl compounds are 4,4'-dihydroxydiphenyl, 2,2-bis(4-hydroxyphenyl)propane (bisphenol A), 2,4-bis(4-hydroxyphenyl)-2-methylbutane, dimethyl-bisphenol A, 1,1-bis(4-hydroxyphenyl)-p-diisopropylbenzene, 2,2-bis(3-methyl-4-hydroxyphenyl)propane, 2,2-bis(3-methyl-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl)sulfone, 2,4-bis(3,5-dimethyl-4-hydroxyphenyl)-2-methylbutane, 1,1-bis(3,5-dimethyl-4-hydroxyphenyl)-p-diisopropylbenzene and 1,1-bis(4-hydroxyphenyl)-3,3,5-trimethylcyclohexane, and bisphenols (I) to (III)

(I)

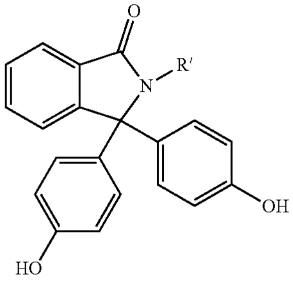

(II)

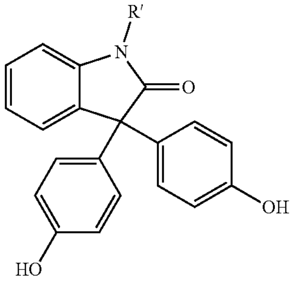

-continued (III)

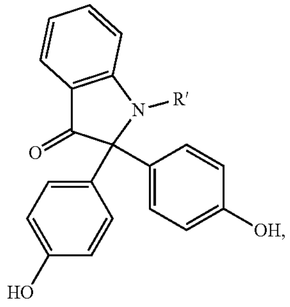

in which R' in each case is $C_1$- to $C_4$-alkyl, aralkyl or aryl, preferably methyl or phenyl, most preferably methyl.

Particularly preferred dihydroxyaryl compounds are 2,2-bis-(4-hydroxyphenyl)-propane (bisphenol A), 2,2-bis(3,5-dimethyl-4-hydroxyphenyl)propane, 1,1-bis(4-hydroxyphenyl)cyclohexane and 1,1-bis(4-hydroxyphenyl)-3,3,5-trimethylcyclohexane (bisphenol TMC) and dimethyl-bisphenol A as well as the dihydroxyaryl compounds of formula (I), (II) and (III).

These and further suitable dihydroxyaryl compounds are described, for example, in U.S. Pat. Nos. 2,999,835 A, 3,148,172 A, 2,991,273 A, 3,271,367 A, 4,982,014 A and 2,999,846 A, in German published specifications 1 570 703 A, 2 063 050 A, 2 036 052 A, 2 211 956 A and 3 832 396 A, in French patent application 1 561 518 A1, in the monograph "H. Schnell, Chemistry and Physics of Polycarbonates, Interscience Publishers, New York 1964, p. 28 ff.; p. 102 ff.", and in "D. G. Legrand, J. T. Bendler, Handbook of Polycarbonate Science and Technology, Marcel Dekker New York 2000, p. 72ff.".

Only one dihydroxyaryl compound is used in the case of the homopolycarbonates; two or more dihydroxyaryl compounds can be used in the case of copolycarbonates. The dihydroxyaryl compounds employed—as well as components of the compositions according to the invention-, similarly to all other chemicals and assistants added to the synthesis, may be contaminated with the contaminants from their own synthesis, handling and storage. However, it is desirable to employ the purest possible raw materials.

Copolycarbonates according to the invention as component A can also be prepared using 1 to 25 wt %, preferably 2.5 to 25 wt % (based on the total amount of diphenols to be used), of polydiorganosiloxanes with hydroxyaryloxy end groups. These are known and can be prepared by processes known in the literature, see, for example, U.S. Pat. No. 3,419,634). Copolycarbonates comprising polydiorganosiloxanes are also suitable; the preparation of copolycarbonates comprising polydiorganosiloxanes is described e.g. in DE-A 3 334 782.

Examples of suitable carbonic acid derivatives include phosgene or diphenyl carbonate.

Suitable chain terminators that may be used in the production of polycarbonates are monophenols. Suitable monophenols are for example phenol itself, alkylphenols such as cresols, p-tert-butylphenol, cumylphenol and mixtures thereof.

Preferred chain terminators are the phenols mono- or polysubstituted by linear or branched $C_1$- to $C_{30}$-alkyl radicals, preferably unsubstituted or substituted by tert-butyl. Particularly preferred chain terminators are phenol, cumylphenol and/or p-tert-butylphenol.

The amount of chain terminator to be used is preferably 0.1 to 5 mol %, based on moles of dihydroxyaryl compounds used in each case. The chain terminators can be added before, during or after the reaction with a carbonic acid derivative.

Suitable branching agents are the trifunctional or more than trifunctional compounds familiar in polycarbonate chemistry, in particular those having three or more than three phenolic OH groups.

Examples of suitable branching agents include 1,3,5-tri (4-hydroxyphenyl)benzene, 1,1,1-tri(4-hydroxyphenyl)ethane, tri(4-hydroxyphenyl)phenylmethane, 2,4-bis(4-hydroxyphenylisopropyl)phenol, 2,6-bis(2-hydroxy-5'-methylbenzyl)-4-methylphenol, 2-(4-hydroxyphenyl)-2-(2,4-dihydroxyphenyl)propane, tetra(4-hydroxyphenyl) methane, tetra(4-(4-hydroxyphenylisopropyl)phenoxy) methane and 1,4-bis((4',4"-dihydroxytriphenyl)methyl) benzene and 3,3-bis(3-methyl-4-hydroxyphenyl)-2-oxo-2,3-dihydroindole.

The amount of any branching agents to be used is 0.05 mol % to 2 mol %, again based on moles of dihydroxy aryl compounds used in each case.

The branching agents can either be initially charged together with the dihydroxyaryl compounds and the chain terminators in the aqueous alkaline phase or added dissolved in an organic solvent before the phosgenation. In the case of the transesterification process the branching agents are used together with the dihydroxyaryl compounds.

Advantageously, the aromatic polycarbonate is based on bisphenol A and preferably has a melt volume flow rate MVR of 5.5 to 15 $cm^3$/10 min, more preferably has a melt volume flow rate MVR of 6 to 12 $cm^3$/10 min and particularly preferably has a melt volume flow rate MVR of 8 to 11 $cm^3$/10 min determined according to DIN EN ISO 1133-1:2012-03 (test temperature 300° C., mass 1.2 kg).

Preferably, the aromatic polycarbonates have weight-average molecular weights ($M_w$, measured by GPC (gel permeation chromatography) with polycarbonate based on bisphenol A as standard) of 20,000 to 32,000 g/mol, preferably of 23,000 to 28,000 g/mol and more preferably of 24,000 to 26,000 g/mol.

As examples of aromatic polycarbonate suitable for the present invention, mention can be made of those produced from bisphenol A and phosgene, and sold under the trade name Makrolon® 2400, Makrolon® 2600, Makrolon® 2800, Makrolon® 3100 by Covestro Co., Ltd.

The aromatic polycarbonates can be used on their own or in any desired mixture.

Advantageously, the aromatic polycarbonate is present in the polycarbonate composition in an amount ranging from 80 to 97.5 parts by weight, preferably 90 to 97 parts by weight, more preferably 92 to 96.5 parts by weight, based on the total amount of the polycarbonate composition being 100 parts by weight, in any way in an amount giving together with the other components a total amount of 100 parts by weight.

Component B

The polycarbonate compositions according to the present invention comprise a metal organic sulfonate as component B.

The incorporation of the metal organic sulfonate improves the flame resistance of the polycarbonate compositions of the present invention.

Examples of the metals contained in the metal organic sulfonate include alkali metals such as lithium (Li), sodium (Na), potassium (K), rubidium (Rb) and cesium (Cs); alkali earth metals such as magnesium (Mg), calcium (Ca), strontium (Sr) and barium (Ba); and aluminum (Al), titanium (Ti), iron (Fe), cobalt (Co), nickel (Ni), copper (Cu), zinc (Zn), zirconium (Zr), molybdenum (Mo), etc. Of those, an alkali metal or an alkali earth metal is preferable. Mechanical properties such as impact resistance, heat-resistance, and good electric characteristics, which a polycarbonate resin has, are not negatively influenced by addition of such flame-retardant salts. A metal organic sulfonate more preferably contained is at least one metal salt compound selected from the group consisting of alkali metal salts and alkaline earth metal salts, even more preferable is an alkali metal salt, wherein the metal is preferably sodium, potassium or cesium. Examples of the metal organic sulfonates include lithium (Li) organic sulfonate, sodium (Na) organic sulfonate, potassium (K) organic sulfonate, rubidium (Rb) organic sulfonate, cesium (Cs) organic sulfonate, magnesium (Mg) organic sulfonate, calcium (Ca) organic sulfonate, strontium (Sr) organic sulfonate, barium (B a) organic sulfonate, etc. Of those, in particular, alkali metal organic sulfonates are preferable, including sodium (Na) organic sulfonate, potassium (K) organic sulfonate compounds, cesium (Cs) organic sulfonate compounds, etc.

Preferred examples of the metal organic sulfonates include metal salts of fluorine-containing aliphatic sulfonic acid, metal salts of fluorine-containing aliphatic sulfonimide, metal salts of aromatic sulfonic acid, and metal salts of aromatic sulfonamide.

Specific examples of preferred ones thereof include:

i) metal salts of fluorine-containing aliphatic sulfonic acids such as:

alkali metal salts of fluorine-containing aliphatic sulfonic acids having at least one C—F bond in the molecule such as potassium perfluorobutane sulfonate, lithium perfluorobutane sulfonate, sodium perfluorobutane sulfonate, cesium perfluorobutane sulfonate, lithium trifluoromethane sulfonate, sodium trifluoromethane sulfonate, potassium trifluoromethane sulfonate, potassium perfluoroethane sulfonate and potassium perfluoropropane sulfonate;

alkali earth metal salts of fluorine-containing aliphatic sulfonic acids having at least one C—F bond in the molecule such as magnesium perfluorobutane sulfonate, calcium perfluorobutane sulfonate, barium perfluorobutane sulfonate, magnesium trifluoromethane sulfonate, calcium trifluoromethane sulfonate, and barium trifluoromethane sulfonate;

alkali metal salts of fluorine-containing aliphatic disulfonic acids having at least one C—F bond in the molecule such as disodium perfluoromethane disulfonate, dipotassium perfluoromethane disulfonate, sodium perfluoroethane disulfonate, dipotassium perfluoroethane disulfonate, dipotassium perfluoropropane disulfonate, dipotassium perfluoroisopropane disulfonate, disodium perfluorobutane disulfonate, potassium perfluorobutane disulfonate, dipotassium perfluorobutane disulfonate and dipotassium perfluorooctane disulfonate;

ii) metal salts of fluorine-containing aliphatic sulfonimides such as:

alkali metal salts of fluorine-containing aliphatic disulfonimides having at least one C—F bond in the molecule such as lithium bis(perfluoropropanesulfonyl)imide, sodium bis(perfluoropropanesulfonyl)imide, potassium bis(perfluoropropanesulfonyl)imide, lithium bis(perfluorobutanesulfonyl)imide, sodium bis(perfluorobutanesulfonyl)imide, potassium bis(perfluorobutanesulfonyl)imide, potassium trifluoromethane (pentafluoroethane)sulfonylimide, sodium trifluoromethane(nonafluorobutane)sulfonylimide, potassium trifluoromethane(nonafluorobutane)sulfonylimide, trifluoromethane, etc.;

alkali metal salts of cyclic fluorine-containing aliphatic sulfonimides having at least one C—F bond in the molecule such as lithium cyclo-hexafluoropropane-1,3-bis(sulfonyl)imide, sodium cyclo-hexafluoropropane-1,3-bis(sulfonyl)imide, and potassium cyclo-hexafluoropropane-1,3-bis(sulfonyl)imide;

iii) metal salts of aromatic sulfonic acids such as:

alkali metal salts of aromatic sulfonates having at least one aromatic group in the molecule such as dipotassium diphenylsulfone-3,3'-disulfonate, potassium diphenylsulfone-3-sulfonate, sodium benzene sulfonate, sodium (poly)styrene sulfonate, sodium paratoluene sulfonate, sodium (branched)dodecylbenzene sulfonate, sodium trichlorobenzene sulfonate, potassium benzene sulfonate, potassium styrene sulfonate, potassium (poly)styrene sulfonate, potassium paratoluene sulfonate, potassium (branched)dodecylbenzene sulfonate, potassium trichlorobenzene sulfonate, cesium benzene sulfonate, cesium (poly) styrene sulfonate, cesium paratoluene sulfonate, cesium (branched)dodecylbenzene sulfonate, and cesium trichlorobenzene sulfonate;

alkali earth metal salts of aromatic sulfonates having at least one aromatic group in the molecule such as magnesium paratoluene sulfonate, calcium paratoluene sulfonate, strontium paratoluene sulfonate, barium paratoluene sulfonate, magnesium (branched)dodecylbenzene sulfonate and calcium (branched) dodecylbenzene sulfonate; and iv) metal salts of aromatic sulfonamides such as:

alkali metal salts of aromatic sulfonamides having at least one aromatic group in the molecule such as sodium salt of saccharin, potassium salt of N-(p-tolylsulfonyl)-p-toluene sulfonimide, potassium salt of N—(N'-banzylaminccarbonyl) sulfanilimide and potassium salt of N-(phenylcarboxyl)-sulfanilimide.

Of those, more preferable are metal salts of fluorine-containing aliphatic sulfonic acids and metal salts of aromatic sulfonic acids, and particularly preferable are metal salts of fluorine-containing aliphatic sulfonic acids.

As the metal salt of fluorine-containing aliphatic sulfonic acids, preferable are alkali metal salts of fluorine-containing aliphatic sulfonic acids having at least one C—F bond in the molecule, particularly preferable are alkali metal salts of perfluoroalkane sulfonic acids. Specifically, potassium perfluorobutane sulfonate etc. are preferable. As metal salts of aromatic sulfonic acids, more preferable are alkali metal salts of aromatic sulfonic acids, particularly preferable are alkali metal salts of diphenylsulfone-sulfonic acid such as dipotassium diphenylsulfone-3,3'-disulfonate, and potassium diphenylsulfone-3-sulfonate; and alkali metal salts of paratoluene sulfonic acid such as sodium paratoluene sulfonate, potassium paratoluene sulfonate and cesium paratoluene sulfonate; and furthermore preferable are alkali metal salts of paratoluene sulfonic acid.

Meanwhile, the metal organic sulfonate may be used in one kind, or in two or more kinds at an arbitrary combination and a ratio.

As the metal organic sulfonate for use in the invention, polymer type metal organic sulfonates may be employed, in addition to above-mentioned metal organic sulfonates. Examples of the polymer type metal organic sulfonates include metal salts having an alkali metal sulfonate residue in thermoplastic resins such as polystyrene, polyacrylonitrile-styrene, polycarbonate or polyethylene terephthalate.

As examples of commercial products of metal organic sulfonates, mention can be made of potassium perfluorobutane sulfonate, sold under the trade name Bayowet C4 by LANXESS AG Germany Most preferably, potassium perfluorbutane sulfonate is used as component B.

The metal organic sulfonate is present in the polycarbonate composition in an amount ranging from 0.1 to 0.3 parts by weight, preferably 0.12 to 0.25 parts by weight, more preferably from 0.15 to 0.2 parts by weight, based on the total amount of the polycarbonate composition being 100 parts by weight.

Component C

The polycarbonate compositions according to the present invention comprise at least one anti-dripping agent as component C.

Preferably, the at least one anti-dripping agent used is selected from the group consisting of fluorinated polyolefins.

The fluorinated polyolefins are known (see "Vinyl and Related Polymers" by Schildknecht, John Wiley & Sons, Inc., New York, 1962, pages 484-494; "Fluoropolymers" by Wall, Wiley-Interscience, John Wiley & Sons, Inc., New York, Volume 13, 1970, pages 623-654; "Modern Plastics Encyclopedia", 1970-1971, Volume 47, No. 10 A, October 1970, McGraw-Hill, Inc., New York, pages 134 and 774; "Modern Plastics Encyclopaedia", 1975-1976, October 1975, Volume 52, No. 10 A, McGraw-Hill, Inc., New York, pages 27, 28 and 472 and U.S. Pat. Nos. 3,671,487, 3,723,373 and 3,838,092).

Preferably, the anti-dripping agent is selected from the group consisting of polytetrafluoroethylene, polyvinylidene fluoride, tetrafluoroethylene/hexafluoropropylene copolymer and ethylene/tetrafluoroethylene copolymer.

More preferably, polytetrafluoroethylene (PTFE) is used as anti-dripping agent.

Polytetrafluoroethylene can be prepared by known processes, for example by polymerization of tetrafluoroethylene in an aqueous medium with a free radical-forming catalyst, for example sodium, potassium or ammonium peroxodisulfate, at pressures of from 7 to 71 kg/cm$^2$ and at temperatures of from 0 to 200° C., preferably at temperatures of from 20 to 100° C., for further details see e.g. application U.S. Pat. No. 2,393,967 A.

Preferably, the fluorinated polyolefins have glass transition temperatures of over −30° C., generally over 100° C., fluorine contents of preferably from 65 to 76 wt. %, in particular from 70 to 76 wt. % (with the fluorinated polyolefins as 100 wt. %), mean particle diameters $d_{50}$ of from 0.05 to 1,000 μm, preferably from 0.08 to 20 μm.

For the purpose of the present invention, the $d_{50}$ average value of the particle size indicates a particle size, such as 50 weight percent of the relevant material have a larger particle size and 50 weight percent have a smaller particle size of the average value.

The $d_{50}$ average size of the particles in the composition of the present invention can be determined via a method known to the person skilled in the art, for example the $d_{50}$ value of the PTFE polymer particle size is measured via light scattering techniques (dynamic or laser) using the respective equipment, for example available from the companies Malvern (e.g. Mastersizer® Micro or 3000) or Coulter (e.g. LS 230®), as notably described in the method ISO 13320-1, in EP 1279694 A and in WO 2014/037375. Laser light scattering, based on the light diffraction on the particles, is a suitable technique that can be applied to this kind of powder for determining particle size distribution. In particular the analysis can be performed on dry powder (for instance using a Coulter LS 13320® instrument) or on the powder suspended into a water solution of apposite dispersant (a suitable apparatus is Coulter LS 230®).

Preferably, the fluorinated polyolefins have a density of from 1.2 to 2.3 g/cm$^3$, as measured according to the ASTM D1895: 2017.

More preferably, the fluorinated polyolefins used according to the invention have mean particle diameters of from 0.05 to 20 μm, preferably from 0.08 to 10 μm, and density of from 1.2 to 1.9 g/cm$^3$.

Suitable fluorinated polyolefins which can be used in powder form are tetrafluoroethylene polymers having mean particle diameters of from 100 to 1000 μm and densities of from 2.0 g/cm$^3$ to 2.3 g/cm$^3$.

As an example of commercial products of polytetrafluoroethylene, mention can be made to those sold under the trade name Teflon® by DuPont.

A master batch of polytetrafluoroethylene and styrene-acrylonitrile (SAN) in a weight ratio of 1:1, for example, ADS 5000 available from Chemical Innovation Co., Ltd., and POLYB FS-200 available from Han Nanotech Co., Ltd, can also be used.

Advantageously, the anti-dripping agent is present in the polycarbonate composition according to the present invention in an amount ranging from 0.3 to 0.7 parts by weights, preferably 0.4 to 0.6 parts by weight, based on the total amount of the polycarbonate composition being 100 parts by weight.

Component D

The polycarbonate compositions according to the present invention comprises at least one hydrolysis stabilizer as component D.

The hydrolysis stabilizers commonly used in polycarbonate compositions can be used in the polycarbonate composition according to the present invention.

For the purpose of the present invention, preferably, the hydrolysis stabilizer is selected from the group consisting of mineral clays and organic acids.

As examples of mineral clays, mention can be made of boehmite, gibbsite, diaspore, kaolin (e.g., kaolinite, pyrophyllite), smectite (e.g. montmorillonite, nontronite, saponite), talc, etc.

As examples of organic acids, mention can be made of citric acid, phosphoric acid and metaphosphoric acid, etc.

Preferably, the hydrolysis stabilizer is selected from the group consisting of boehmite, kaolin, talc, citric acid, etc.

As commercial products for hydrolysis stabilizers, mention can be made to Boehmite sold under the trade name Pural® 200 by Sasol Germany GmbH, kaolin sold under the trade name Polyfil HG90 by KaMin LLC, talc sold under the trade name HTP® Ultra 5C by IMIFABI SPA, citric acid sold under the trade name Citric Acid Anhydrous by Weifang Ensign Industry Co., Ltd.

If the hydrolysis stabilizer is Boehmite, it is preferably present in the polycarbonate composition according to the present invention in an amount ranging from 0.2 to 2 part by weight, based on the total amount of the polycarbonate composition being 100 parts by weight.

If the hydrolysis stabilizer is citric acid, it is preferably present in the polycarbonate composition according to the present invention in an amount ranging from 0.1 to 0.5 part by weight, based on the total amount of the polycarbonate composition being 100 parts by weight.

If the hydrolysis stabilizer is kaolin, it is preferably present in the polycarbonate composition according to the present invention in an amount ranging from 1 to 4 part by weight, based on the total amount of the polycarbonate composition being 100 parts by weight.

If the hydrolysis stabilizer is talc, it is preferably present in the polycarbonate composition according to the present invention in an amount ranging from 1 to 4 part by weight, based on the total amount of the polycarbonate composition being 100 parts by weight.

Component E

The polycarbonate compositions according to the present invention comprise at least one polysilsesquioxane as component E.

The polysilsesquioxane, as used herein, has a trifunctional siloxane unit represented by $RSiO_{1.5}$ (R is hydrogen or a monovalent organic group) (hereinafter, it may be referred to as a "T unit"), and contains the unit, in 100% by mol of the total siloxane units (M unit, D unit, T unit, Q unit), in 90% by mol or more, more preferably in 95% by mol or more, furthermore preferably in 100% by mol.

Meanwhile, the M unit represents a monofunctional siloxane unit represented by $R_3Si_{0.5}$ (R is hydrogen or a monovalent organic group), the D unit represents a bifunctional siloxane unit represented by $R_2SiO_{1.0}$ (R is hydrogen or a monovalent organic group), and the Q unit represents a tetrafunctional siloxane unit represented by $SiO_{2.0}$.

The polysilsesquioxane may contain an M unit, in addition to the T unit.

Examples of R bonded to the polysilsesquioxane include hydrogen, $C_1$-$C_{12}$ alkyl, $C_2$-$C_{12}$ alkenyl, $C_1$-$C_{12}$ alkoxy, $C_1$-$C_{12}$ acyl, $C_3$-$C_8$ cycloalkyl, and phenyl. Preferably, R is selected from hydrogen, $C_1$-$C_6$ alkyl, $C_1$-$C_6$ alkenyl, $C_1$-$C_6$ alkoxy, and phenyl. More preferably, R is selected from alkyl groups having 1 to 6 carbon atoms such as a methyl group, an ethyl group, a propyl group, a butyl group, and a hexyl group. Of those, as the organic group R, a methyl group is preferable, for the purpose of the present invention. Preferably, polymethylsilsesquioxane is used as the polysilsesquioxane, alone or in combination with other polysilsesquioxanes, particularly preferred alone.

Preferable polysilsesquioxanes as described above can be produced by a publicly known method. For example, as described in JP-A-01-217039, JP-A-5-125187 or JP-A-6-263875, the polysilsesquioxane is obtained by hydrolyzing organosilane under an acidic condition, adding and mixing an alkali aqueous solution to aqueous or aqueous/organic solvent of organosilanetriol, and leaving the product in a static state to thereby polycondensate the organosilanetriol.

As examples of commercial products of polysilsesquioxanes, mention can be made of polymethylsilsesquioxane sold under the trade name Ganzpearl SI-020 by GANZ CHEMICAL CO., LTD and under the trade name ABC E+308 by ABC NANOTECH CO., LTD.

The polysilsesquioxane is present in the polycarbonate compositions according to the present invention in an amount ranging from 2 to 7, preferably 2.0 to 7.0, more preferably 3.0 to 5.0 parts by weight, based on the total amount of the polycarbonate composition being 100 parts by weight.

Component F

In addition to components A-E mentioned above, the polycarbonate compositions according to the present invention can optionally comprise as component F one or more additional additives conventionally used in polymer compositions in conventional amounts. Such additives are lubricants, demoulding agents (e.g. pentaerythritol tetrastearate (PETS), glycerine monostearate(GMS), their carbonates), antioxidants, dyes, pigments, UV absorbers, etc.

The person skilled in the art can select the type and the amount of the additional additives so as to not significantly adversely affect the desired properties of the polycarbonate composition according to the present invention. The amount of the additional additives preferably is up to 15 parts by weight, more preferably up to 10 parts by weight, even more preferably up to 6 parts by weight, based on that the total amount of the polycarbonate composition is 100 parts by weight.

Preferably, the polycarbonate composition according to the present invention comprises:

A) 80-97.35 parts by weight of an aromatic polycarbonate, wherein the aromatic polycarbonate is based on bisphenol A, B) 0.15-0.25 parts by weight of metal organic sulfonate, wherein at least potassium perfluorobutane sulfonate is contained as metal organic sulfonate, more preferably the metal organic sulfonate is potassium perfluorobutane sulfonate, C) 0.4-0.6 parts by weight of anti-dripping agent, wherein polytetrafluoroethylene is contained as anti-dripping agent, more preferably the anti-dripping agent is polytetrafluorethylene;

D) 0.1-4 parts by weight of hydrolysis stabilizer, wherein the hydrolysis stabilizer is selected from the group consisting of boehmite, kaolin, talc, citric acid and combinations thereof, and E) 2-7 parts by weight of polysilsesquioxane, wherein polymethylsilsesquioxane is contained as polysilsesquioxane, more preferably the polysilsesquioxane is polymethylsilsesquioxane, wherein the total amount of the composition is 100 parts by weight.

More preferably, the polycarbonate composition according to the present invention consists of:

A) 80-97.25 parts by weight of an aromatic polycarbonate, wherein the aromatic polycarbonate is based on bisphenol A, B) 0.15-0.25 part by weight of metal organic sulfonate, wherein at least potassium perfluorobutane sulfonate is contained as metal organic sulfonate, more preferably the metal organic sulfonate is potassium perfluorobutane sulfonate, C) 0.4-0.6 parts by weight of anti-dripping agent, wherein polytetrafluoroethylene is contained as anti-dripping agent, more preferably the anti-dripping agent is polytetrafluorethylene;

D) 0.2-2 parts by weight of hydrolysis stabilizer, wherein boehmite is contained as hydrolysis stabilizer, more preferably the hydrolysis stabilizer is boehmite, E) 2-7 parts by weight of polysilsesquioxane, wherein polymethylsilsesquioxane is contained as polysilsesquioxane, more preferably the polysilsesquioxane is polymethylsilsesquioxane, and F) up to 15 parts by weight of one or more additional additives selected from lubricants, demoulding agents, antioxidants, dyes, pigments, and UV absorbers, wherein the total amount of the composition is 100 parts by weight.

Alternatively more preferably, the polycarbonate composition according to the present invention consists of:

A) 80-97.35 parts by weight of an aromatic polycarbonate, wherein the aromatic polycarbonate is based on bisphenol A, B) 0.15-0.25 part by weight of metal organic sulfonate, wherein at least potassium perfluorobutane sulfonate is contained as metal organic sulfonate, more preferably the metal organic sulfonate is potassium perfluorobutane sulfonate;

C) 0.4-0.6 parts by weight of anti-dripping agent, wherein polytetrafluoroethylene is contained as anti-dripping agent, more preferably the anti-dripping agent is polytetrafluorethylene;

D) 0.1-0.5 parts by weight of hydrolysis stabilizer, wherein citric acid is contained as hydrolysis stabilizer, preferably the hydrolysis stabilizer is citric acid, E) 2-5 parts by weight of polysilsesquioxane, wherein polymethylsilsesquioxane is contained as polysilsesquioxane, more preferably the polysilsesquioxane is polymethylsilsesquioxane, F) up to 15 parts by weight of one or more additional additives selected from lubricants, demoulding agents, antioxidants, dyes, pigments, and UV absorbers, wherein the total amount of the composition is 100 parts by weight.

Alternatively more preferably, the polycarbonate composition according to the present invention consists of:

A) 80-96.45 parts by weight of an aromatic polycarbonate, wherein the aromatic polycarbonate is based on bisphenol A, B) 0.15-0.25 part by weight of metal organic sulfonate, wherein at least potassium perfluorobutane sulfonate is contained as metal organic sulfonate, more preferably the metal organic sulfonate is potassium perfluorobutane sulfonate;

C) 0.4-0.6 parts by weight of anti-dripping agent, wherein polytetrafluoroethylene is contained as anti-dripping agent, more preferably the anti-dripping agent is polytetrafluorethylene;

D) 1-4 parts by weight of hydrolysis stabilizer, wherein kaolin is contained as hydrolysis stabilizer, preferably the hydrolysis stabilizer is kaolin, E) 2-4 parts by weight of polysilsesquioxane, wherein polymethylsilsesquioxane is contained as polysilsesquioxane, more preferably the polysilsesquioxane is polymethylsilsesquioxane, and F) up to 15 parts by weight of one or more additional additives selected from lubricants, demoulding agents, antioxidants, dyes, pigments, and UV absorbers, wherein the total amount of the composition is 100 parts by weight.

Alternatively more preferably, the polycarbonate composition according to the present invention consists of:

A) 80-96.45 parts by weight of an aromatic polycarbonate, wherein the aromatic polycarbonate is based on bisphenol A, B) 0.15-0.25 part by weight of metal organic sulfonate, wherein at least potassium perfluorobutane sulfonate is contained as metal organic sulfonate, more preferably the metal organic sulfonate is potassium perfluorobutane sulfonate;

C) 0.4-0.6 parts by weight of anti-dripping agent, wherein polytetrafluoroethylene is contained as anti-dripping agent, more preferably the anti-dripping agent is polytetrafluorethylene;

D) 1-4 parts by weight of hydrolysis stabilizer, wherein talc is contained as hydrolysis stabilizer, preferably the hydrolysis stabilizer is talc, E) 2-4 parts by weight of polysilsesquioxane, wherein polymethylsilsesquioxane is contained as polysilsesquioxane, more preferably the polysilsesquioxane is polymethylsilsesquioxane, and F) up to 15 parts by weight of one or more additional additives selected from lubricants, demoulding agents, antioxidants, dyes, pigments, and UV absorbers, wherein the total amount of the composition is 100 parts by weight.

The inventors have discovered that the polycarbonate compositions according to the present invention have a good flame retardance even after 7 days immersion in hot water of 70° C., and that an article with a thickness of 1.2 mm prepared from the compositions can achieve V-0 performance before and after 7 days immersion in hot water of 70° C.

Preparation of the Polycarbonate Compositions

The polycarbonate compositions according to the present invention can be in the form of, for example, pellets, and can be prepared by a variety of methods involving intimate admixing of the materials desired in the composition.

For example, the materials desired in the composition are first blended in a high speed mixer. Other low shear processes, including but not limited to hand mixing, can also accomplish this blending. The blend is then fed into the throat of a twin-screw extruder via a hopper. Alternatively, at least one of the components can be incorporated into the composition by feeding it directly into the extruder at the throat and/or downstream through a side stuffer. Additives can also be compounded into a masterbatch with a desired polymeric resin and fed into the extruder. The extruder is generally operated at a temperature higher than that necessary to cause the composition to flow. The extrudate is immediately quenched in a water batch and pelletized. The pellets can be one-fourth inch long or less as described. Such pellets can be used for subsequent molding, shaping or forming.

Melt blending methods are preferred due to the availability of melt blending equipment in commercial polymer processing facilities.

Illustrative examples of equipment used in such melt processing methods include co-rotating and counter-rotating extruders, single screw extruders, co-kneaders, and various other types of extrusion equipment.

The temperature of the melt in the processing is preferably minimized in order to avoid excessive degradation of the polymers. It is often desirable to maintain the melt temperature between 230° C. and 350° C. in the molten resin composition, although higher temperatures can be used provided that the residence time of the resin in the processing equipment is kept short.

In some cases, the melting composition exits from a processing equipment such as an extruder through small exit holes in a die. The resulting strands of the molten resin are cooled by passing the strands through a water bath. The cooled strands can be chopped into small pellets for packaging and further handling.

Shaped Articles

The polycarbonate compositions according to the present invention can be used, for example for the production of various types of shaped articles.

The present invention also provides a shaped article made from a polycarbonate composition according to the present invention.

As examples of such shaped articles mention can be made of, for example, films; profiles; all kinds of housing parts, e.g. for domestic appliances such as juice presses, coffee machines and mixers, or for office machines such as monitors, flat screens, notebooks, printers and copiers; sheets; tubes; electrical conduits; windows, doors and other profiles for the building sector (interior and exterior applications); electrical and electronic parts such as switches, plugs and sockets; and body parts or interior trim for commercial vehicles, especially for the motor vehicle sector.

In particular, the shaped article can be any of the following: interior trim for rail vehicles, ships, aeroplanes, buses and other motor vehicles, housings for electrical equipment containing small transformers, housings for information processing and transmission equipment, housings and sheathing for medical equipment, housings for safety devices, moulded parts for sanitary and bath fittings, covering grids for ventilation apertures and housings for garden tools, and battery packages Preparation of Shaped Articles The polycarbonate compositions according to the present invention can be processed into shaped articles by a variety of means such as injection moulding, extrusion moulding, blow moulding or thermoforming to form shaped articles.

The present invention provides a process for preparing the shaped article made from a composition according to the present invention, comprising injection moulding, extrusion moulding, blow moulding or thermoforming the polycarbonate composition according to the present invention.

Use of Polysilsesquioxane

The inventors have discovered unexpectedly that a polysilsesquioxane can substantially improve the hydrolysis resistance of a polycarbonate composition comprising a hydrolysis stabilizer.

Thus, the present invention provides use of a polysilsesquioxane as hydrolysis resistance synergist in a polycarbonate composition comprising at least one hydrolysis stabilizer, wherein the amount of the polysilsesquioxane is 2-7 parts by weight, based on that the total amount of the polycarbonate composition is 100 parts by weight.

Preferably, a polysilsesquioxane is contained which has a trifunctional siloxane unit represented by $RSiO_{1.5}$ (R is hydrogen or a monovalent organic group) (hereinafter, it may be referred to as a "T unit"), and contains the unit, in 100% by mol of the total siloxane units (M unit, D unit, T unit, Q unit), in 90% by mol or more, more preferably in 95% by mol or more, furthermore preferably in 100% by mol.

Meanwhile, the M unit represents a monofunctional siloxane unit represented by $R_3SiO_{0.5}$ (R is hydrogen or a monovalent organic group), the D unit represents a bifunctional siloxane unit represented by $R^2SiO_{1.0}$ (R is hydrogen or a monovalent organic group), and the Q unit represents a tetrafunctional siloxane unit represented by $SiO_{2.0}$.

The polysilsesquioxane may contain an M unit, in addition to the T unit.

Examples of R bonded to the polysilsesquioxane include hydrogen, $C_1$-$C_{12}$ alkyl, $C_2$-$C_{12}$ alkenyl, $C_1$-$C_{12}$ alkoxy, $C_1$-$C_{12}$ acyl, $C_3$-$C_8$ cycloalkyl, and phenyl. Preferably, R is selected from hydrogen, $C_1$-$C_6$ alkyl, $C_1$-$C_6$ alkenyl, $C_1$-$C_6$ alkoxy, and phenyl. More preferably, R is selected from alkyl groups having 1 to 6 carbon atoms such as a methyl group, an ethyl group, a propyl group, a butyl group, and a hexyl group. Of those, as the organic group R, a methyl group is preferable, for the purpose of the present invention. Preferably, polymethylsilsesquioxane is used as the polysilsesquioxane.

It can be understood that the features mentioned as preferred, more preferred, etc. for the polycarbonate composition as such do apply also for the use of the polysilsesquioxane according to the invention.

The examples which follow serve to illustrate the invention in greater detail.

EXAMPLES

Materials Used

Component A

- A1: an aromatic polycarbonate (PC) resin based on bisphenol A having a melt volume flow rate MVR of 12 $cm^3$/10 min (according to DIN EN ISO 1133-1:2012-03 at a test temperature of 300° C. under a 1.2 kg load), available as Makrolon® 2600 from Covestro Polymer, Co., Ltd.
- A2: an aromatic polycarbonate (PC) resin based on bisphenol A having a melt volume flow rate MVR of 9.0 $cm^3$/10 min (according to DIN EN ISO 1133-1:2012-03 at a test temperature of 300° C. under a 1.2 kg load), available as Makrolon® 2800 from Covestro Polymer, Co., Ltd.
- A3: an aromatic polycarbonate (PC) resin based on bisphenol A having a melt volume flow rate MVR of 6.0 $cm^3$/10 min (according to DIN EN ISO 1133-1:2012-03 at a test temperature of 300° C. under a 1.2 kg load), available as Makrolon® 3100 from Covestro Polymer, Co., Ltd.

Component B

- B1: potassium perfluorobutane sulfonate, available as Bayowet C4 from LANXESS AG, Germany.

Component C

- C1: a masterbatch of polytetrafluoroethylene and Styrene-Acrylonitrile (SAN) in a weight ratio of 1:1, available as ADS 5000 from Chemical Innovation Co., Ltd. Thailand.

Component D

- D1: boehmite, available as Pural® 200 from Sasol Germany GmbH.
- D2: kaolin, available as Polyfil HG90 from KaMin LLC
- D3: talc, available as HTP® Ultra 5C from IMIFABI SPA.
- D4: citric acid, available as citric acid anhydrous from Weifang Ensign Industry Co., Ltd.

Component E

- E1: polymethylsilsesquioxane with a mean particle diameter: 0.8±0.2 μm determined by MALVERN MS2000, available as ABC E+308 from ABC NANOTECH CO., LTD.
- E1: polymethylsilsesquioxane with an average particle size: 1.4-2.4 μm determined by Coulter Counter method, available as Ganzpearl SI-020 from GANZ CHEMICAL CO., LTD.

Component F

- F1: pentaerythritol tetrastearate (PETS), a demoulding agent, available as Loxiol P 861 from Emery Oleochemicals Sdn Bhd Malaysia.
- F2: mixture of 80 wt. % of Irgafos® 168 (tris(2,4-ditert-butylphenyl) phosphite) and 20 wt. % of Irganox® 1076 (2,6-ditert-butyl-4-(octadecanoxycarbonylethyl) phenol, available as Irganox® B900 from BASF (China) Company Limited.
- F3: an UV filter, 2,2'-methylenebis(6-(benzotriazol-2-yl)-4-tert-octylphenol, available as TINUVIN360 from BASF.

Test Methods

The physical properties of the compositions according to the examples were tested as follows.

The IZOD notched impact strength was measured on test bars of dimensions 80 mm×10 mm×3 mm in accordance with ISO 180/IA:2000.

The flame retardance was evaluated on 127 mm×12.7 mm×1.2 mm bars according to UL94-2015.

The hydrolysis stability of the compositions prepared was assessed based on the change in flame retardancy rate measured on 127 mm×12.7 mm×1.2 mm bars according to UL94:2015 before and after the bars were immerged into 70° C. water for 7 days.

Invention Examples IE1-IE6 and Comparative Examples CE0-CE6

The materials listed in Table 1 were compounded on a twin-screw extruder (ZSK-25) (Werner and Pfleider) at a speed of rotation of 225 rpm, a throughput of 20 kg/h, and a machine temperature of 260° C., and granulated. All parts by weight are calculated according to the weight of active ingredient.

The granules were processed into corresponding test specimens on an injection moulding machine with a melting temperature of 260° C. and a mold temperature 80° C.

The physical properties of compositions obtained were tested and the results were summarized in Table 1.

TABLE 1

| | Components | CE0 [pbw] | CE1 [pbw] | CE2 [pbw] | CE3 [pbw] | CE4 [pbw] | CE5 [pbw] | CE6 [pbw] | IE1 [pbw] | IE2 [pbw] | IE3 [pbw] | IE4 [pbw] | IE5 [pbw] | IE-6 [pbw] |
|---|---|---|---|---|---|---|---|---|---|---|---|---|---|---|
| A | Makrolon ®2600 | 96.45 | — | — | 97.9 | 96.45 | 97.4 | 96.9 | — | — | 95.9 | 94.9 | 92.9 | 90.9 |
| | Makrolon ®2800 | — | — | 97.9 | — | — | — | — | — | 95.9 | — | — | — | — |
| | Makrolon ®3100 | — | 97.9 | — | — | — | — | — | 95.9 | — | — | — | — | — |
| B | Bayowet C4 | 0.2 | 0.2 | 0.2 | 0.2 | 0.2 | 0.2 | 0.2 | 0.2 | 0.2 | 0.2 | 0.2 | 0.2 | 0.2 |
| C | ADS 5000 | 0.5 | 0.5 | 0.5 | 0.5 | 0.5 | 0.5 | 0.5 | 0.5 | 0.5 | 0.5 | 0.5 | 0.5 | 0.5 |
| D | Pural ® 200 | — | 0.55 | 0.55 | 0.55 | 2 | 0.55 | 0.55 | 0.55 | 0.55 | 0.55 | 0.55 | 0.55 | 0.55 |
| E | ABC E + 308 | 2.0 | — | — | — | — | 0.5 | 1.0 | 2.0 | 2.0 | 2.0 | 3.0 | 5.0 | 7.0 |
| F | TINUVIN360 | 0.3 | 0.3 | 0.3 | 0.3 | 0.3 | 0.3 | 0.3 | 0.3 | 0.3 | 0.3 | 0.3 | 0.3 | 0.3 |
| | Irganox ® B900 | 0.15 | 0.15 | 0.15 | 0.15 | 0.15 | 0.15 | 0.15 | 0.15 | 0.15 | 0.15 | 0.15 | 0.15 | 0.15 |
| | Loxiol P 861 | 0.4 | 0.4 | 0.4 | 0.4 | 0.4 | 0.4 | 0.4 | 0.4 | 0.4 | 0.4 | 0.4 | 0.4 | 0.4 |
| | Flame-retardant level at 1.2 mm | | | | | | | | | | | | | |
| | before immersion in water | V-0 | V-0 | V-0 | V-0 | V-0 | V-0 | V-0 | V-0 | V-0 | V-0 | V-0 | V-0 | V-0 |
| | after immersion in water at 70° C. for 7 days | V-1 | Fail* | V-1 | V-1 | Fail* | V-1 | V-1 | V-0 | V-0 | V-0 | V-0 | V-0 | V-0 |
| | Hydrolysis resistance | Fail | Fail | Fail | Fail | Fail | Fail | Fail | Pass | Pass | Pass | Pass | Pass | Pass |

Fail*: indicates that V-1 is not passed.

The composition of comparative example 0 (CE0) not comprising any hydrolysis stabilizer demonstrated a flame-retardant level of V-0 before immersion in water, and a flame-retardant level of V-1 after immersion in water at 70° C. for 7 days, meaning that the hydrolysis resistance is not acceptable.

The compositions of comparative example 1 to comparative example 4 (CE1-CE4) not comprising any polysilsesquioxane demonstrate a flame-retardant level of V-0 before immersion in water and do not achieve a flame-retardant level of V-0 after immersion in water at 70° C. for 7 days, meaning that the hydrolysis resistance is not acceptable.

It can be seen from comparison of comparative example 3(CE3) and comparative example 4 (CE4) that a flame-retardant level of V-0 can neither be achieved after immersion in water at 70° C. for 7 days by significantly increasing the amount of hydrolysis stabilizer.

It can be concluded from comparative examples CE0-CE4 that the hydrolysis resistance is not acceptable by adding hydrolysis stabilizer or polysilsesquioxane alone.

The compositions of comparative examples 5-6 (CE5-CE6) comprising all of components A-F, wherein the amount of polysilsesquioxane is no more than 1 part by weight based on that the total amount of the composition is 100 parts by weight, demonstrate a flame-retardant level of V-0 before immersion in water, and a flame-retardant level of V-1 after immersion in water at 70° C. for 7 days, meaning that the hydrolysis resistance is not acceptable.

The compositions of invention examples 1-6 (IE1-IE6) comprising all of components A-F, wherein the amount of polysilsesquioxane is from 2 to 7 parts by weight based on that the total amount of the composition is 100 parts by weight, demonstrate a flame-retardant level of V-0 before immersion in water, and a flame-retardant level of V-0 after immersion in water at 70° C. for 7 days, meaning that the hydrolysis resistance is excellent.

Invention Examples IE7-IE8 and Comparative Example CE7

Similarly, the materials listed in Table 2 were compounded, the physical properties of the compositions obtained were tested and the results are summarized in Table 2.

TABLE 2

| | Components | CE7 [pbw] | IE7 [pbw] | IE8 [pbw] |
|---|---|---|---|---|
| A | Makrolon ® 2600 | 98.35 | 95.35 | 95.35 |
| B | Bayowet C4 | 0.2 | 0.2 | 0.2 |
| C | ADS 5000 | 0.5 | 0.5 | 0.5 |
| D | citric acid | 0.1 | 0.1 | 0.1 |
| E | Ganzpearl SI-020 | — | — | 3.0 |
| | ABC E + 308 | — | 3.0 | — |
| F | TINUVIN360 | 0.3 | 0.3 | 0.3 |
| | Irganox ® B900 | 0.15 | 0.15 | 0.15 |
| | Loxiol P 861 | 0.4 | 0.4 | 0.4 |
| | Flame-retardant level at 1.2 mm | | | |
| | before immersion in water | V-0 | V-0 | V-0 |
| | after immersion in water at 70° C. for 7 days | Fail* | V-0 | V-0 |
| | Hydrolysis resistance | Fail | Pass | Pass |

Fail*: indicates that V-1 is not passed.

The composition of comparative example 7 (CE7) not comprising any polysilsesquioxane demonstrates a flame-retardant level of V-0 before immersion in water and does not achieve a flame-retardant level of V-1 after immersion in water at 70° C. for 7 days, meaning that the hydrolysis resistance is not acceptable.

The compositions of invention examples 7-8 (IE7-IE8) comprising all of components A-F, wherein the amount of polysilsesquioxane is 3 parts by weight based on that the total amount of the composition is 100 parts by weight, demonstrates a flame-retardant level of V-0 before immersion in water, and a flame-retardant level of V-0 after immersion in water at 70° C. for 7 days, meaning that the hydrolysis resistance is excellent.

Invention Examples IE94E10 and Comparative Example CE8

Similarly, the materials listed in Table 3 were compounded, the physical properties of the compositions obtained were tested and the results are summarized in Table 3.

TABLE 3

| | Components | CE8 [pbw] | IE9 [pbw] | IE10 [pbw] |
|---|---|---|---|---|
| A | Makrolon ® 2600 | 97.45 | 94.45 | 93.45 |
| B | Bayowet C4 | 0.2 | 0.2 | 0.2 |
| C | ADS 5000 | 0.5 | 0.5 | 0.5 |
| D | Polyfil HG90 | 1.0 | 1.0 | 2.0 |
| E | ABC E + 308 | 0 | 3.0 | 3.0 |
| F | TINUVIN360 | 0.3 | 0.3 | 0.3 |
| | Irganox ® B900 | 0.15 | 0.15 | 0.15 |
| | Loxiol P 861 | 0.4 | 0.4 | 0.4 |
| | Flame-retardant level at 1.2 mm | | | |
| | before immersion in water | V-0 | V-0 | V-0 |
| | after immersion in water at 70° C. for 7 days | Fail* | V-0 | V-0 |
| | Hydrolysis resistance | Fail | Pass | Pass |

Fail*: indicates that V-1 is not passed.

The composition of comparative example CE8 not comprising any polysilsesquioxane demonstrates a flame-retardant level of V-0 before immersion in water and does not achieve a flame-retardant level of V-1 after immersion in water at 70° C. for 7 days, meaning that the hydrolysis resistance is not acceptable.

The compositions of invention examples IE9 and IE10 comprising all of components A-F, wherein the amount of polysilsesquioxane is 3 parts by weight based on that the total amount of the composition is 100 parts by weight, demonstrate a flame-retardant level of V-0 before immersion in water, and a flame-retardant level of V-0 after immersion in water at 70° C. for 7 days, meaning that the hydrolysis resistance is excellent.

Invention Examples IE11 and IE12 and Comparative Example CE9

Similarly, the materials listed in Table 4 were compounded, the physical properties of the compositions obtained were tested and the results are summarized in Table 4.

TABLE 4

| | Components | CE9 [pbw] | IE11 [pbw] | IE12 [pbw] |
|---|---|---|---|---|
| A | Makrolon ® 2600 | 96.95 | 93.95 | 92.45 |
| B | Bayowet C4 | 0.2 | 0.2 | 0.2 |

TABLE 4-continued

| | Components | CE9 [pbw] | IE11 [pbw] | IE12 [pbw] |
|---|---|---|---|---|
| C | ADS 5000 | 0.5 | 0.5 | 0.5 |
| D | HTP ® Ultra 5C | 1.50 | 1.50 | 3.0 |
| E | ABC E + 308 | 0 | 3.0 | 3.0 |
| F | TINUVIN360 | 0.3 | 0.3 | 0.3 |
| | Irganox ® B900 | 0.15 | 0.15 | 0.15 |
| | PETS | 0.4 | 0.4 | 0.4 |
| | Flame-retardant level at 1.2 mm | | | |
| | before immersion in water | V-0 | V-0 | V-0 |
| | after immersion in water at 70° C. for 7 days | V-1 | V-0 | V-0 |
| | Hydrolysis resistance | Fail | Pass | Pass |

The composition of comparative example CE9 not comprising any polysilsesquioxane demonstrates a flame-retardant level of V-0 before immersion in water and does not achieve a flame-retardant level of V-1 after immersion in water at 70° C. for 7 days, meaning that the hydrolysis resistance is not acceptable.

The compositions of invention examples IE11 and IE12 comprising all of components A-F, wherein the amount of polysilsesquioxane is 3 parts by weight based on that the total amount of the composition is 100 parts by weight, demonstrate a flame-retardant level of V-0 before immersion in water, and a flame-retardant level of V-0 after immersion in water at 70° C. for 7 days, meaning that the hydrolysis resistance is excellent.

Invention Examples IE13-IE20

Similarly, the materials listed in Table 5 were compounded, the physical properties of the compositions obtained were tested and the results are summarized in Table 5.

TABLE 5

| | Components | IE-13 [pbw] | IE-14 [pbw] | IE-15 [pbw] | IE-16 [pbw] | IE-117 [pbw] | IE-18 [pbw] | IE-19 [pbw] | TE-20 [pbw] |
|---|---|---|---|---|---|---|---|---|---|
| A | Makrolon ®2600 | 95.05 | 95.05 | 93.05 | 93.05 | 95.35 | 95.35 | 93.35 | 93.35 |
| B | Bayowet C4 | 0.2 | 0.2 | 0.2 | 0.2 | 0.2 | 0.2 | 0.2 | 0.2 |
| C | ADS 5000 | 0.5 | 0.5 | 0.5 | 0.5 | 0.5 | 0.5 | 0.5 | 0.5 |
| D | Pural ® 200 | 0.4 | 0.4 | 0.4 | 0.4 | — | — | — | — |
| | CITRIC ACID | — | — | — | — | 0.1 | 0.1 | 0.1 | 0.1 |
| E | ABC E + 308 | 3.0 | — | 5.0 | — | 3.0 | — | 5.0 | — |
| | Ganzpearl SI-020 | — | 3.0 | — | 5.0 | — | 3.0 | — | 5.0 |
| F | TINUVIN360 | 0.3 | 0.3 | 0.3 | 0.3 | 0.3 | 0.3 | 0.3 | 0.3 |
| | Irganox ® B900 | 0.15 | 0.15 | 0.15 | 0.15 | 0.15 | 0.15 | 0.15 | 0.15 |
| | Loxiol P 861 | 0.4 | 0.4 | 0.4 | 0.4 | 0.4 | 0.4 | 0.4 | 0.4 |
| | Flame-retardant level at 1.2 mm | | | | | | | | |
| | before immersion | V-0 | V-0 | V-0 | V-0 | V-0 | V-0 | V-0 | V-0 |
| | after immersion in water at 70° C. for 7 days | V-0 | V-0 | V-0 | V-0 | V-0 | V-0 | V-0 | V-0 |
| | Hydrolysis resistance | Pass | Pass | Pass | Pass | Pass | Pass | Pass | Pass |
| | Izod notched impact strength [KJ/$m^2$] | | | | | | | | |
| | 23° C., 3 mm | 64.0 | 65.0 | 61.5 | 60.0 | 64.9 | 65.1 | 58.5 | 59.8 |
| | 23° C., 3 mm after immersion in water at 70° C. for 7 days | 60.3 | 63.5 | 60.0 | 58.8 | 62.0 | 63.4 | 50.3 | 58.3 |
| | −20° C., 3 mm | 46.9 | 57.4 | 51.8 | 45.8 | 49.8 | 44.1 | 51.4 | 42.8 |
| | −30° C., 3 mm | 35.4 | 42.6 | 49.9 | 35.3 | 34.7 | 44.8 | 44.1 | 34.0 |

The compositions of invention examples IE13 to IE20 comprising all of components A-F, wherein the amount of polysilsesquioxane is from 3.0 to 5.0 parts by weight based on that the total amount of the composition is 100 parts by weight, demonstrate a flame-retardant level of V-0 before immersion in water, and a flame-retardant level of V-0 after immersion in water at 70° C. for 7 days, meaning that the hydrolysis resistance is excellent.

Meanwhile, the compositions of invention examples IE13 to IE20 demonstrate a good impact resistance even at a lower temperature of −30° C.

From the examples according to the invention illustrated above, it can be concluded that the composition according to the present invention have a combination of hydrolysis resistance, flame retardance, and good impact resistance even at low temperatures.

The invention claimed is:

1. A polycarbonate composition consisting of:

A) 80-97.5 parts by weight of aromatic polycarbonate,

B) 0.1-0.3 parts by weight of metal organic sulfonate;

C) 0.3-0.7 parts by weight of anti-dripping agent;

D) 0.1-4 parts by weight of hydrolysis stabilizer,

E) 2-7 parts by weight of polysilsesquioxane, and

F) 0-15 parts by weight of one or more additives selected from the group consisting of lubricants, demoulding agents, antioxidants, dyes, pigments, and UV absorbers, wherein the total amount of the composition is 100 parts by weight.

2. The composition according to claim 1, wherein the metal of the metal organic sulfonate is one or more selected from the group consisting of lithium (Li), sodium (Na), potassium (K), rubidium (Rb), cesium (Cs), magnesium (Mg), calcium (Ca), strontium (Sr), barium (Ba), aluminum (Al), titanium (Ti), iron (Fe), cobalt (Co), nickel (Ni), copper (Cu), zinc (Zn), zirconium (Zr) and molybdenum (Mo).

3. The composition according to claim 1, wherein the metal organic sulfonate is selected from the group consisting of metal salts of fluorine-containing aliphatic sulfonic acid, metal salts of fluorine-containing aliphatic sulfonimide, metal salts of aromatic sulfonic acid, metal salts of aromatic sulfonamide, and combinations thereof.

4. The composition according to claim 1, wherein the anti-dripping agent is selected from the group consisting of fluorinated polyolefins, polyvinylidene fluoride, tetrafluoroethylene/hexafluoropropylene copolymer, ethylene/tetrafluoroethylene copolymer and combinations thereof.

5. The composition according to claim 1, wherein the hydrolysis stabilizer is selected from the group consisting of mineral clays and organic acids.

6. The composition according to claim 1, wherein the polysilsesquioxane has a trifunctional siloxane unit represented by $RSiO_{1.5}$, R is hydrogen or a monovalent organic group, and wherein the trifunctional siloxane unit is present in 90% by mol or more of the total siloxane units.

7. The composition according to claim 6, wherein the organic group R is selected from hydrogen, $C_1$-$C_{12}$ alkyl, $C_2$-$C_{12}$ alkenyl, $C_1$-$C_{12}$ alkoxy, $C_1$-$C_{12}$ acyl, $C_3$-$C_8$ cycloalkyl, hydroxy, and phenyl.

8. The composition according to claim 1, wherein the metal organic sulfonate is potassium perfluorobutane sulfonate.

9. A shaped article made from the composition according to claim 1.

10. A process for preparing the shaped article according to claim 9, comprising injection moulding, extrusion moulding, blow moulding or thermoforming a polycarbonate composition consisting of:

A) 80-97.5 parts by weight of aromatic polycarbonate,

B) 0.1-0.3 parts by weight of metal organic sulfonate;

C) 0.3-0.7 parts by weight of anti-dripping agent;

D) 0.1-4 parts by weight of hydrolysis stabilizer,

E) 2-7 parts by weight of polysilsesquioxane, and

F) 0-15 parts by weight of one or more additives selected from the group consisting of lubricants, demoulding agents, antioxidants, dyes, pigments, and UV absorbers, wherein the total amount of the composition is 100 parts by weight.

11. The composition according to claim 5, wherein the hydrolysis stabilizer is selected from boehmite, kaolin, talc, citric acid and combinations thereof.

12. The composition of claim 1, wherein one of the demoulding agents is pentaerythritol tetrastearate, glycerine monostearate, or one of their carbonates.

* * * * *